United States Patent
Hiraiwa et al.

(10) Patent No.: US 8,530,055 B2
(45) Date of Patent: Sep. 10, 2013

(54) CERAMIC GREEN BODY AND METHOD FOR PRODUCING THE SAME

(75) Inventors: Toshiki Hiraiwa, Nagoya (JP); Takuji Kimura, Kariya (JP)

(73) Assignee: NGK Insulators, Ltd., Nagoya (JP)

( * ) Notice: Subject to any disclaimer, the term of this patent is extended or adjusted under 35 U.S.C. 154(b) by 246 days.

(21) Appl. No.: 13/011,069

(22) Filed: Jan. 21, 2011

(65) Prior Publication Data

US 2011/0217557 A1   Sep. 8, 2011

(30) Foreign Application Priority Data

Mar. 8, 2010   (JP) ................. 2010-049984

(51) Int. Cl.
*B32B 27/40* (2006.01)
*B29C 39/12* (2006.01)

(52) U.S. Cl.
USPC ............. 428/424.2; 428/524.5; 156/246

(58) Field of Classification Search
USPC ............................. 428/425.5, 424.2
See application file for complete search history.

(56) References Cited

U.S. PATENT DOCUMENTS

| | | | |
|---|---|---|---|
| 7,291,444 B2 * | 11/2007 | Yamashiki et al. | 430/284.1 |
| 2002/0055571 A1 | 5/2002 | Hirano et al. | |
| 2009/0209700 A1 | 8/2009 | Kimura et al. | |
| 2010/0055436 A1 | 3/2010 | Kimura et al. | |

FOREIGN PATENT DOCUMENTS

| | | |
|---|---|---|
| EP | 2 243 758 A1 | 10/2010 |
| JP | 62-011778 | 1/1987 |
| JP | 62-223057 | 10/1987 |
| JP | 05-096671 | 4/1993 |
| JP | 2002-255655 A1 | 9/2002 |
| JP | 2005-159256 | 6/2005 |
| JP | 2006-121012 A1 | 5/2006 |
| WO | 2009/104703 A1 | 8/2009 |
| WO | 2010/024364 A1 | 3/2010 |

OTHER PUBLICATIONS

Extended European Search Report dated Jul. 5, 2013.

* cited by examiner

*Primary Examiner* — Thao T. Tran
(74) *Attorney, Agent, or Firm* — Burr & Brown

(57) ABSTRACT

The ceramic green sheet is formed by molding and drying "a ceramic slurry containing a ceramic powder, an unreacted portion of an isocyanate, an unreacted portion of a polyol, a urethane resin that is produced by mixing isocyanate and polyol and serves as an organic binder, and a solvent", the ceramic slurry being prepared by mixing the ceramic powder, the isocyanate, the polyol, and the solvent. A thin sheet-like molded body is formed by printing a molded body of a paste, which is prepared by mixing a ceramic powder, an organic binder that is a resin not containing a hydroxyl group, and a solvent, on the ceramic green sheet, and by drying the resultant. A dry shrinkage percentage of the ceramic green sheet upon forming the thin sheet-like molded body thereon can significantly be reduced.

9 Claims, 3 Drawing Sheets

FIG.1

Repeating-unit-based molecular weight $Mu = \dfrac{Mi}{Ri} + \dfrac{Mp}{Rp}$

CERAMIC GREEN BODY AND METHOD FOR PRODUCING THE SAME

DESCRIPTION OF RELATED ART

1. Field of the Invention

The present invention relates to a ceramic green body having a thin sheet-like molded body (before being fired) formed on a thin ceramic green sheet, and a method for producing the same, and more particularly to a ceramic green body in which a ceramic green sheet contains a urethane resin (polyurethane). In the present specification, the "green" means the state before the firing.

2. Background Art

Hitherto, there has widely been known a ceramic green body having a molded body (before being fired) containing an organic binder formed on a thin ceramic green sheet containing a ceramic powder and an organic binder (see, for example, Japanese Patent Application Laid-Open (kokai) No. 2006-121012). As the organic binder contained in the ceramic green sheet and the molded body, polyvinyl butyral that is a resin containing a hydroxyl group (OH group, hydroxy group) is used, for example.

Conventionally, ceramic green sheets are generally produced by the following technique. First, a ceramic green sheet serving as a substrate is produced. In order to form the ceramic green sheet, a ceramic powder, an organic binder (e.g., polyvinyl butyral), and a solvent are mixed to prepare a ceramic slurry. The ceramic slurry is molded into a thin sheet with a doctor blade method, or the like. The molded body of the ceramic slurry is dried to evaporate the solvent, thereby producing (completing) a thin ceramic green sheet. In this case, the produced ceramic green sheet has a residual solvent content of less than 1%.

Then, a thin sheet-like molded body (before being fired) is formed on the (completed) ceramic green sheet. In order to form the molded body, an organic binder (e.g., polyvinyl butyral), and a solvent are mixed to prepare a paste. The thin sheet-like molded body of this paste is formed on the ceramic green sheet with a screen printing method. The thin sheet-like molded body of the paste is dried to completely evaporate the solvent, whereby the thin sheet-like molded body is formed on the ceramic green sheet.

However, in the method for producing the ceramic green body described above, the ceramic green sheet has a problem of tendency to easily heat-shrink; i.e., exhibits a large dry shrinkage percent, in the process of drying the thin sheet-like molded body of the paste formed on the (completed) ceramic green sheet. This is caused by the fact that the total volume of pores present in the green sheet is decreased with the progress of evaporation of the solvent penetrated into the ceramic green sheet, which decreases intermolecular distances between organic binder molecules. For the (completed) ceramic green sheet, the reduction ratio of the "size of the thin sheet-like molded body of the paste after being dried" (after the formation of the thin sheet-like molded body) to the "size of the thin sheet-like molded body of the paste before being formed (printed)" is referred to as the "dry shrinkage percentage" below.

With ceramic green sheets exhibiting a large dry shrinkage percentage, high positioning accuracy is difficult to obtain. Thus, there is demand for reduction of the dry shrinkage percentage of ceramic green sheets.

The applicant of the present application has proposed in pamphlet of International Publication No. 2009/104703 that a urethane resin, which is formed through a reaction (urethane reaction) between an isocyanate and a polyol, which are mixed in the slurry, is used, instead of the polyvinyl butyral, as the organic binder in the ceramic slurry used for producing the ceramic green sheet. In the method for producing the ceramic green sheet described above, the ceramic slurry is gelled due to the urethane reaction. Therefore, this method is also referred to as a "gelcasting method". An unreacted portion of the isocyanate group and an unreacted portion of the polyol group remain in a slight amount in the ceramic green sheet produced by the "gelcasting method" using the isocyanate and the polyol.

According to the study of the applicant of the present application, when the conventional thin sheet-like molded body (i.e., a thin sheet-like molded body (before being fired) containing an organic binder that is a resin containing a hydroxyl group such as polyvinyl butyral) is formed on the ceramic green sheet formed by the "gelcasting method" using the isocyanate and the polyol, it has been found that the dry shrinkage percentage of the ceramic green sheet is slightly decreased, compared to the case in which the same conventional thin sheet-like molded body is formed on a conventional ceramic green sheet (i.e., the sheet formed by using the organic binder such as polyvinyl butyral).

The reason why the dry shrinkage percentage of the ceramic green sheet is decreased is considered to be based upon the fact that crosslinking is formed between adjacent molecules of the urethane resin in the ceramic slurry with the progress of gelling due to the urethane reaction, so that a strong network is formed between the molecules of the urethane resin. The formation of the network makes it difficult to shorten the distance between the molecules of the urethane resin (organic binder), even if evaporation of residual solvent progresses.

However, it is considered that the reason why the dry shrinkage percentage is not significantly reduced is because polyvinyl butyral that is the resin containing a hydroxyl group is used as the organic binder in the paste used for forming the thin sheet-like molded body. Specifically, the hydroxyl group (OH group) contained in the organic binder in the paste reacts with (makes a urethane reaction with) the isocyanate group remaining in the (completed) ceramic green sheet to cause the action of shrinking the ceramic green sheet. The shrinkage described above is referred to as "reaction shrinkage caused by the urethane reaction".

When an improvement is made only for the ceramic green sheet in order to reduce the dry shrinkage percentage of the ceramic green sheet as described above, the phenomenon in which the dry shrinkage percentage of the ceramic green sheet is significantly reduced cannot occur because of the hindrance by the "reaction shrinkage caused by the urethane reaction". Therefore, a further reduction in the dry shrinkage percentage of the ceramic green sheet has been demanded.

SUMMARY OF THE INVENTION

Accordingly, the present invention aims to provide a ceramic green body including a thin sheet-like molded body formed on a ceramic green sheet that is formed through a "gelcasting method" using an isocyanate and a polyol, wherein a dry shrinkage percentage of the ceramic green sheet upon forming the thin sheet-like molded body thereon can significantly be reduced.

A ceramic green body according to the present invention includes a thin ceramic green sheet containing a ceramic powder, and a urethane resin that is produced by mixing isocyanate and polyol and serves as an organic binder; and a thin sheet-like molded body (before being fired) that is formed on the ceramic green sheet, and contains a ceramic powder and an organic binder not containing a hydroxyl group. Here, examples of the "resin not containing a hydroxyl group" of the organic binder in the thin sheet-like molded body include a resin containing (only) an ester group at a main chain and/or a side chain. The organic binder in the thin sheet-like molded body is preferably water-insoluble.

Specifically, in the ceramic green body according to the present invention, the ceramic green sheet is formed such that "a ceramic slurry containing a ceramic powder, an unreacted portion of the isocyanate, an unreacted portion of the polyol, a urethane resin serving as the organic binder formed through reaction between the isocyanate and the polyol, and the solvent", which ceramic slurry is prepared by mixing the ceramic powder, isocyanate, polyol, and the solvent, is molded into a thin sheet-like shape, the urethane resin is further formed through reaction between the unreacted portion of the isocyanate and the unreacted portion of the polyol, the portions being contained in the molded body of the ceramic slurry, to thereby solidify the molded body, and the molded body of the ceramic slurry is dried to evaporate the solvent. In other words, the ceramic green sheet is formed with the "gelcasting method" using the isocyanate and the polyol.

The thin sheet-like molded body is formed such that a thin sheet-like molded body of a paste, which is prepared by mixing a ceramic powder, the organic binder not containing the hydroxyl group, and the solvent, is formed on the ceramic green sheet, and the formed thin sheet-like molded body of the paste is dried to evaporate the solvent.

It has been found that, according to the ceramic green body of the present invention, the dry shrinkage percentage of the ceramic green sheet upon forming the thin sheet-like molded body on the (completed) ceramic green sheet is significantly reduced. This is considered to be based upon the reason that the hydroxyl group (OH group) is not contained in the resin of the organic binder in the paste. Specifically, a subject that is reacted (makes the urethane reaction) with the isocyanate group (NCO group) remaining in the (completed) ceramic green sheet is not present in the paste, whereby the above-mentioned "reaction shrinkage by the urethane reaction" cannot be caused.

In the ceramic green body according to the present invention, the glass transition temperature of the organic binder in the thin sheet-like molded body is preferably 40° C. or less. According to the study, it has been found that, the lower the glass transition temperature of the organic binder in the thin sheet-like molded body (i.e., the organic binder in the paste) is, the smaller the dry shrinkage percentage of the ceramic green sheet becomes (see Table 1 described later).

On the other hand, the thin sheet-like molded body (paste) can be used as an adhesive agent (adhesive paste) interposed between the adjacent sheets when plural ceramic green sheets are stacked. In this case, the applicant of the present application sets the target value of the "dry shrinkage percentage" of each of the ceramic green sheets to be "0.075% or less".

It has been found that, if the organic binder having the glass transition temperature of 40° C. or less is used as the organic binder in the paste, the target value of "0.075% or less" for the dry shrinkage percentage can be attained for the respective ceramic green sheets. Further, when the glass transition temperature of the organic binder in the paste is 40° C. or less, the temperature for thermal compression bond (that is generally set to be the temperature higher than the glass transition temperature by about 20° C.) for stacking plural ceramic green sheets can also be set to be a sufficiently low value. As a result, the dimensional precision during a thermal compression bonding process can easily be secured, compared to the case in which the temperature for thermal compression bond is high.

It has already been found from the study that a ceramic green sheet having excellent properties in terms of plasticity, punching property, and sinterability, and also exhibiting a low percent (heat) shrinkage can be provided when the following conditions are satisfied: a functional-group ratio of the polyol to the isocyanate (i.e., a molar ratio of hydroxyl group to isocyanate group) that are employed for the mixing falls within a range of 1.5/11.5 to 11.5/11.5, the molecular weight of the urethane resin, which is defined as the sum of a value obtained by dividing the molecular weight of a isocyanate group by the isocyanate group content of the isocyanate employed for mixing and a value obtained by dividing the molecular weight of a hydroxyl group by the hydroxyl group content of the polyol employed for mixing, falls within a range of 290 to 988, and the ratio by weight of the urethane resin to the ceramic powder contained in the ceramic green sheet falls within a range of 4.5 to 10 parts by weight of the urethane resin based on 100 parts by weight of the ceramic powder. This has already been described in pamphlet of International Publication No. 2009/104703.

Accordingly, a ceramic green sheet meeting all the properties required for facilitating the subsequent treatments of the ceramic green sheet in a balanced manner can be provided.

A method for producing a ceramic green body according to the present invention can be described as follows. In order to produce a ceramic green sheet, a ceramic powder, an isocyanate, a polyol, and a solvent are mixed, to thereby prepare a ceramic slurry containing the ceramic powder, an unreacted portion of the isocyanate, an unreacted portion of the polyol, a urethane resin serving as a binder formed through reaction between the isocyanate and the polyol, and the solvent. Then, the ceramic slurry is molded into a thin sheet.

Then, the urethane resin is further formed through reaction between the unreacted portion of the isocyanate and the unreacted portion of the polyol, the portions being contained in the molded body of the ceramic slurry, to thereby solidify the molded body of the ceramic slurry, and dry the molded body of the ceramic slurry to evaporate the solvent, so as to form the thin ceramic green sheet.

On the other hand, in order to form the thin sheet-like molded body, the ceramic powder, the organic binder not containing a hydroxyl group, and the solvent are mixed to form a paste. A thin sheet-like molded body of the paste is formed on the produced ceramic green sheet. The produced thin sheet-like molded body of the paste is dried to evaporate the solvent, to thereby form the thin sheet-like molded body on the ceramic green sheet.

DETAILED DESCRIPTION OF THE INVENTION

Hereinafter, an embodiment of the method for producing "a ceramic green body including a ceramic green sheet and a thin sheet-like molded body (before being fired)" according to the present invention will be described with reference to the drawings.

In this embodiment, the ceramic green sheet is generally produced through the following procedure.

Step 1: adding a solvent and a dispersant to a ceramic powder with mixing, to thereby prepare a ceramic slurry precursor.

Step 2: adding a polyol, an isocyanate, and a catalyst to the ceramic slurry precursor prepared in step 1 with mixing, to thereby prepare a ceramic slurry.

Step 3: molding the ceramic slurry prepared in step 2 into a thin sheet.

Step 4: solidifying and drying the molded body (thin sheet) prepared in step 3, to thereby form a urethane resin, and evaporating the solvent off the molded body.

Through the above procedure, the ceramic green sheet is produced. The ceramic green sheet is produced by a "gelcasting method" using the isocyanate and the polyol. As described above, the solvent, the dispersant, the isocyanate and polyol (which form urethane resin via urethane reaction), and the catalyst for accelerating urethane reaction are added as organic ingredients of the ceramic slurry. These organic ingredients impart plasticity and shape retainability to a ceramic material, which is a material having no plasticity, and are decomposed and removed through sintering (firing), thereby not remaining in a sintered product (final product).

The thin sheet-like molded body (before being fired) is generally formed on the thus produced ceramic green sheet through the following procedure.

Step 5: adding an organic binder containing only an ester group on a main chain and/or a side chain, and not containing a hydroxyl group, a solvent, and a dispersant to a ceramic powder with mixing, to thereby prepare a paste.

Step 6: forming the thin sheet-like molded body of the paste, which is produced in step 5, on the ceramic green sheet produced in step 4.

Step 7: solidifying and drying the thin sheet-like molded body of the paste, which is produced in step 6, to thereby evaporate the solvent off the thin sheet-like molded body.

Through the above procedure, the thin sheet-like molded body (before being fired) is formed on the ceramic green sheet, whereby the ceramic green body is completed. As described above, the solvent, the dispersant, and the organic binder such as PBMA are added as the organic ingredients of the paste. These organic ingredients are decomposed and removed through sintering (firing), thereby not remaining in a sintered product (final product).

The respective steps will next be described in more detail.
Details of Step 1:

The ceramic powder may be formed of an oxide ceramic material or a non-oxide ceramic material. Examples of such ceramic materials include alumina ($Al_2O_3$), zirconia ($ZrO_2$), barium titanate ($BaTiO_3$), silicon nitride ($Si_3N_4$), and silicon carbide (SiC). These materials may be used singly or in combination of two or more species. No particular limitation is imposed on the particle size of the ceramic material, so long as a slurry can be prepared from the ceramic material.

No particular limitation is imposed on the species of solvent, so long as the solvent can dissolve the aforementioned dispersant, isocyanate, polyol, and catalyst. Examples of the solvent include hydrocarbons (toluene, xylene, solvent naphtha, etc.), ether (ethylene glycol monoethyl ether, butyl carbitol, butyl carbitol acetate, etc.), alcohol (isopropanol, 1-butanol, ethanol, 2-ethylhexanol, terpineol, ethylene glycol, glycerin, etc.), ketone (acetone, methyl ethyl ketone, etc.), ester (butyl acetate, dimethylglutaric acid, triacetin, etc.), and polybasic acid (glutaric acid, etc.). It is particularly preferable to use solvent species each having two or more ester bonds such as acid esters of polyhydric alcohols (e.g., triacetin).

No particular limitation is imposed on the dispersant, so long as the ceramic powder is uniformly dispersed in the solvent. Examples of the dispersant include polycarboxylic acid copolymers, polycarboxylic acid salts, sorbitan fatty acid ester, polyglyceryl fatty acid ester, phosphate ester salt copolymers, sulfonate salt copolymers, polyurethane polyester copolymers having a tertiary amine, etc. It is particularly preferable to use polycarboxylic acid copolymers, and polycarboxylic acid salts. The addition of the dispersant can impart low viscosity and high fluidity to the paste before being molded.

Figure 1:
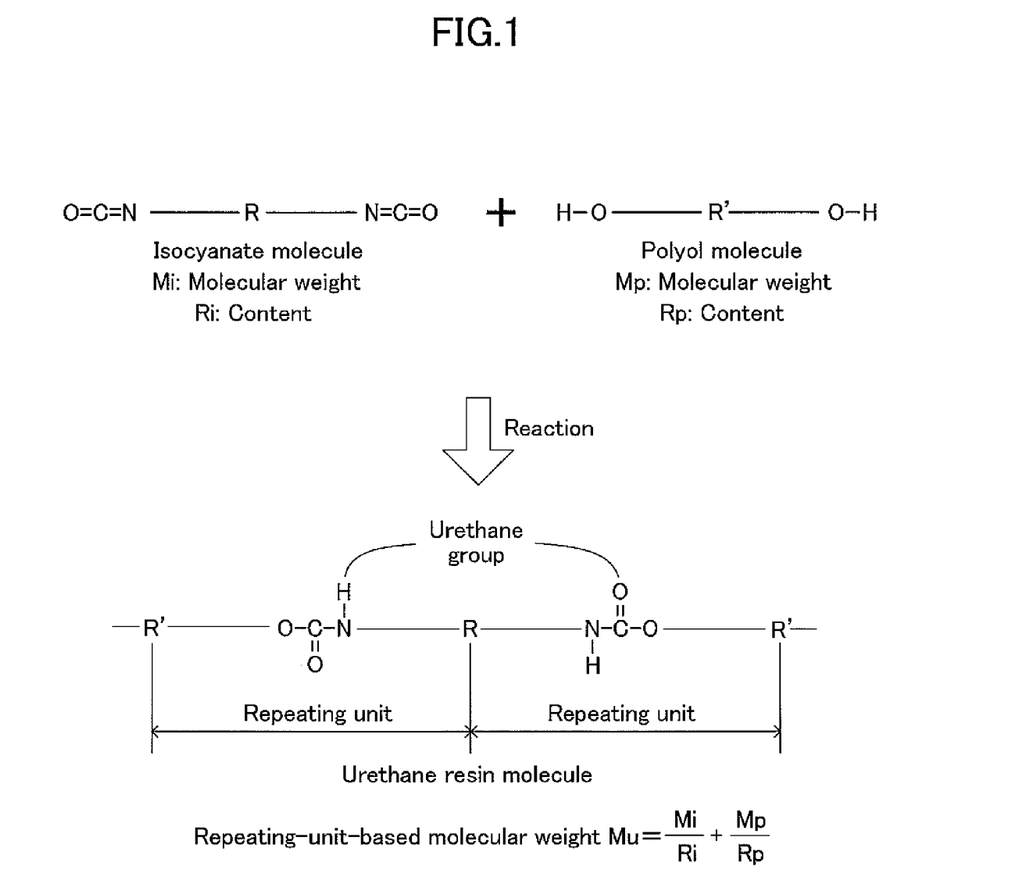
FIG. 1 schematically illustrates the repeating-unit-based molecular weight of a molecule of a urethane-resin serving as an organic binder in a ceramic green sheet according to an embodiment of the present invention.

As described above, the ceramic slurry precursor is prepared by adding the solvent and the dispersant to the ceramic powder at predetermined proportions, and mixing and grinding them for a predetermined period of time.
Details of Step 2:

As shown in FIG. 1, after molding of the slurry, the isocyanate and the polyol contained in the slurry undergo urethane reaction, to thereby produce a urethane resin (polyurethane) serving as an organic binder. No particular limitation is imposed on the species of isocyanate, so long as the substance has an isocyanate group serving as a functional group. Examples of the substance include tolylene diisocyanate (TDI), diphenylmethane diisocyanate (MDI), and modified products thereof. A reactive functional group other than isocyanate group may be contained in the molecule of each substance. Furthermore, a plurality of reactive functional groups may be contained in the molecule of each substance as in the case of polyisocyanates.

No particular limitation is imposed on the species of polyol, so long as the polyol has a functional group reactive with an isocyanate group; such as a hydroxyl group or an amino group. Examples of the polyol include ethylene glycol (EG), polyethylene glycol (PEG), propylene glycol (PG), polypropylene glycol (PPG), polytetramethylene glycol (PTMG), polyhexamethylene glycol (PHMG), and polyvinyl butyral (PVB).

No particular limitation is imposed on the species of catalyst, so long as the catalyst is capable of accelerating urethane reaction. Examples of the catalyst include triethylenediamine, hexanediamine, and 6-dimethylamino-1-hexanol.

As described above, the isocyanate, the polyol, and the catalyst are added to the ceramic slurry precursor, followed by mixing and degassed in vacuum, whereby a ceramic slurry is prepared.
Details of Step 3:

The above-described ceramic slurry is molded into a thin sheet through a known technique. For example, the ceramic slurry is molded into a thin sheet having a thickness of 200 μm or less, by a sheet-molding machine employing a doctor blade.
Details of Step 4:

The above-described sheet (molded body) is heated and/or left to stand within the ambient temperature range for solidification and drying. The solidification and drying of the sheet may be performed by heating the sheet inside the sheet-molding machine, or may be performed indoors at ambient temperature. Alternatively, the sheet may be solidified and dried by heating and subsequently allowed to stand at ambient temperature. By solidification and drying, solvent is evaporated off the sheet (molded body), while the ceramic slurry (sheet) is solidified via the urethane reaction, whereby the ceramic green sheet (final product) is produced. Organic ingredients (e.g., urethane resin) remaining in the ceramic green sheet are removed from the sheet via decomposition, evaporation, etc., during subsequent sintering.

Hereinafter, the aforementioned case where urethane resin is employed as an organic binder will be described in more detail. In this case, crosslinking occurs between adjacent molecules of the urethane resin with the progress of gelling as described above, so that urethane groups contained in the respective molecules of the urethane resin are linked to each other.

The crosslinking can form a network which links the molecules of the urethane resin. As a result, a decrease in intermolecular distance in the urethane resin (organic binder) contained in the sheet is suppressed, even when evaporation of residual solvent progresses in a process which involves heating.

The shorter the distance between adjacent ones of a plurality of the urethane groups contained in the respective molecules of the urethane resin (hereinafter the distance is referred to as urethane-group distance), the denser the network. Accordingly, the sheet tends to exhibit a lower percent (heat) shrinkage and an enhanced punching property. However, the plasticity tends to decrease. In other words, the longer the urethane-group distance, the coarser the network. Accordingly, the sheet tends to exhibit a higher percent (heat) shrinkage and a deteriorated punching property. However, the plasticity tends to increase.

As shown in FIG. 1, the molecular weight of the urethane resin (hereinafter referred to as repeating-unit-based molecular weight: Mu) is defined by the following formula (1):

$$Mu=(Mi/Ri)+(Mp/Rp) \quad (1)$$

In formula (1), Mi denotes the molecular weight of an isocyanate group which is contained in an isocyanate (liquid isocyanate) used for the preparation of a slurry; Mp denotes the molecular weight of a hydroxyl group which is contained in a polyol (liquid polyol) used for the preparation of the slurry; Ri denotes the isocyanate group content of the isocyanate (liquid isocyanate) used for the preparation of the slurry; and Rp denotes the hydroxyl group content of the polyol (liquid polyol) used for the preparation of the slurry.

The repeating-unit-based molecular weight (Mu) as defined above corresponds to the molecular weight of one repeating unit in the urethane resin molecule shown in FIG. 1. Thus, the repeating-unit-based molecular weight (Mu) is a value representing the urethane-group distance and, therefore, the larger (smaller) the Mu, the longer (shorter) the urethane-group distance. In other words, with increasing (decreasing) of the repeating-unit-based molecular weight (Mu), percent (heat) shrinkage becomes larger (smaller), the punching property is more deteriorated (is more enhanced), and plasticity is more enhanced (more deteriorated).

In addition, when an excessive number of urethane resin molecules exist in the ceramic green sheet (i.e., the ratio by weight of urethane resin to ceramic powder in the ceramic green sheet is excessively large), the inter-particle distance of the ceramic powder excessively increases. Thus, the ceramic green sheet tends to exhibit an inferior sinterability during sintering. In contrast, when the ratio by weight of urethane resin to the ceramic powder in the sheet is excessively low, the inter-molecular distance between urethane resin molecules increases excessively. Thus, the binder function of the urethane resin deteriorates, so that the shape retainability after drying tends to deteriorate.

The ceramic green sheets are required to have plasticity (difficulty of generating cracks due to the bending), punching property (difficulty of generating cracks on a punched section), and sinterability (easiness of being sintered), and to exhibit a low percent (heat) shrinkage, in order to facilitate the subsequent processes of the sheets and firing.

The present inventor's studies have revealed that a ceramic green sheet having plasticity, punching property, and sinterability and exhibiting a low percent (heat) shrinkage can be provided under the following conditions. Specifically, in the polyol and the isocyanate employed for the preparation of a slurry, the functional-group ratio of polyol to isocyanate falls within a range of 1.5/11.5 to 11.5/11.5. The repeating-unit-based molecular weight (Mu) of the urethane resin falls within a range of 290 to 988. The ratio by weight of urethane resin to ceramic powder contained in the ceramic green sheet falls within a range of 4.5 to 10 parts by weight of the urethane resin based on 100 parts by weight of the ceramic powder.

Details of Step 5:

The ceramic powder may be formed of an oxide ceramic material or a non-oxide ceramic material. Examples of such ceramic materials include alumina ($Al_2O_3$), zirconia ($ZrO_2$), barium titanate ($BaTiO_3$), silicon nitride ($Si_3N_4$), and silicon carbide (SiC). These materials may be used singly or in combination of two or more species. No particular limitation is imposed on the particle size of the ceramic material, so long as a paste can be prepared from the ceramic material.

No particular limitation is imposed on the species of the organic binder, so long as the organic binder contains only ester group on its main chain and/or side chain and does not contain a hydroxyl group. Examples of usable organic binder include polymethacrylic acids (e.g., PMMA: polymethylmethacrylate, PEMA: polyethylmethacrylate, PBMA: polybutylmethacrylate, etc.), polyacrylic acids (e.g., PMA: polymethyl acrylate, PEA: polyethyl acrylate, PBA: polybutyl acrylate, etc.), polyvinyl acetate (PVAc), etc.

No particular limitation is imposed on the species of solvent, so long as the solvent can dissolve the aforementioned dispersant, and the organic binder. Examples of the solvent include hydrocarbons (toluene, xylene, solvent naphtha, etc.), ether (ethylene glycol monoethyl ether, butyl carbitol, etc.), alcohol (isopropanol, 1-butanol, ethanol, 2-ethylhexanol, terpineol, ethylene glycol, glycerin, etc.), ketone (acetone, methyl ethyl ketone, etc.), ester (butyl acetate, dimethylglutaric acid, triacetin, etc.), and polybasic acid (glutaric acid, etc.).

No particular limitation is imposed on the dispersant, so long as the ceramic powder is uniformly dispersed in the solvent. Examples of the dispersant include polycarboxylic acid copolymers, polycarboxylic acid salts, sorbitan fatty acid ester, polyglyceryl fatty acid ester, phosphate ester salt copolymers, sulfonate salt copolymers, polyurethane polyester copolymers having a tertiary amine, etc. The addition of the dispersant can impart low viscosity and high fluidity to the paste before being molded.

As described above, the ceramic powder, organic binder, solvent, and dispersant are mixed and degassed in vacuum, whereby a paste is prepared.

Details of Step 6:

A thin sheet-like molded body made of the above-mentioned paste and having a predetermined pattern is formed on the completed ceramic green sheet through one of known techniques. For example, the paste is molded into a thin sheet having a thickness of 20 µm with a screen printing method.

Details of Step 7:

The above-described thin sheet-like molded body of the paste formed on the ceramic green sheet as described above is heated and/or left to stand within the ambient temperature range for solidification and drying. The molded body may be solidified and dried by heating and subsequently allowed to stand at ambient temperature. By solidification and drying, solvent is evaporated off the thin sheet-like molded body of the paste, whereby a thin sheet-like molded body (before being fired) is formed on the ceramic green sheet. Thus, the ceramic green body is completed. Organic ingredients (e.g., organic binder) remaining in the thin sheet-like molded body are removed from the body via decomposition, evaporation, etc., during subsequent sintering.

(Dry Shrinkage Percentage of Ceramic Green Sheet)

As described above, in the ceramic green body according to the present embodiment, the "urethane resin produced through the reaction (urethane reaction) between the isocyanate and the polyol" is used as the organic binder in the ceramic slurry for producing the ceramic green sheet (gel-casting method), and the "resin containing only an ester group at the main chain and/or the side chain and not containing a hydroxyl group" is used as the organic binder in the paste for forming the thin sheet-like molded body.

The experiment, which is conducted for confirming the relationship between the "combination of the organic binder in the ceramic slurry and the organic binder in the paste" and the "dry shrinkage percentage of the ceramic green sheet", will be described below. The "dry shrinkage percentage of the ceramic green sheet" is defined as the reduction ratio (%) of the "size of the ceramic green sheet after the thin sheet-like molded body of the paste is dried" (the size after the execution of the step 7) to the "size of the ceramic green sheet before the thin sheet-like molded body of the paste is formed (printed)" (the size before the execution of the step 6).

TABLE 1

| | Organic binder in slurry | Organic binder in paste | Tg [° C.] | Dry shrinkage percentage [%] |
|---|---|---|---|---|
| Embodiment 1 | Urethane resin formed through reaction between isocyanate and polyol | Pn-BMA | 20 | 0.046 |
| Embodiment 2 | | Pn/i-BMA | 36 | 0.067 |
| Embodiment 3 | | Pi-BMA | 48 | 0.100 |
| Conventional product B | | Polyvinyl butyral | 66 | 0.120 |
| Conventional product A | Polyvinyl butyral | Polyvinyl butyral | 66 | 0.150 |

As illustrated in Table 1, in this experiment, the embodiments 1 to 3 corresponding to the present embodiment and the conventional products A and B corresponding to the conventional example were formed. The embodiments 1 to 3 were produced through the above-mentioned (step 1) to (step 7).

In Table 1, in the embodiments 1 to 3 and in the conventional product B, 4,4'-diphenylmethane diisocyanate was used as the isocyanate in the ceramic slurry, and solution prepared by dissolving 10 wt. % of polyvinyl butyral (molecular amount was about 23 thousand, the butyration degree was 74 mol %) in the mixture of triacetin and the organic dibasic acid ester (1:9) serving as a solvent was used as the polyol. In the conventional product A, polyvinyl butyral (molecular amount was about 52 thousand, the butyration degree was 68 mol %) was used as the organic binder in the ceramic slurry.

Pn-BMA (poly(n-butyl methacrylate), the molecular amount was about 0.35 million) was used as the organic binder in the paste in the embodiment 1, Pn/1-BMA (copolymer of poly(n-butyl methacrylate) and poly(i-buryl methacrylate), the molecular amount was about 0.25 million, the copolymerization was Pn-BMA:Pi-BMA=40 mol %:60 mol %) was used as the organic binder in the paste in the embodiment 2, and Pi-BMA (poly(i-butyl methacrylate), the molecular amount was about 0.20 million) was used as the organic binder in the paste in the embodiment 3. The organic binders in the embodiments 1 to 3 correspond to the "resin containing an ester group on the main chain and/or the side chain and not containing a hydroxyl group". In the conventional products A and B, polyvinyl butyral (molecular amount was about 19 thousand, the butyration degree was 63 mol %) was used as the organic binder in the paste.

In the embodiments 1 to 3 and in the conventional product B, zirconia ($ZrO_2$) powder was used as the ceramic powder in the ceramic slurry, a mixture of triacetin and an organic dibasic acid ester (1:9) was used as the solvent in the ceramic slurry, polycarboxylic acid copolymer was used as the dispersant in the ceramic slurry, and 6-dimethylamino-1-hexanol was used as the catalyst for accelerating the urethane reaction in the ceramic slurry.

In the conventional product A, zirconia ($ZrO_2$) powder was used as the ceramic powder in the ceramic slurry, a mixture of xylene and 1-butanol (1:1) was used as the solvent in the ceramic slurry, and sorbitan fatty acid ester was used as the dispersant in the ceramic slurry.

In the embodiments 1 to 3 and the conventional product A, zirconia ($ZrO_2$) powder was used as the ceramic powder in the paste, 2-ethylhexanol was used as the solvent in the paste, and polyurethane polyester copolymer having tertiary amine was used as the dispersant in the paste.

In the embodiments 1 to 3 and in the conventional product B, the functional-group ratio of polyol to isocyanate, used for preparing the ceramic slurry, fell within a range of 1.5/11.5 to 11.5/11.5, the repeating-unit-based molecular weight Mu of the urethane resin fell within a range of 290 to 988, and the ratio by weight of the urethane resin to the ceramic powder fell within a range of 4.5 to 10 parts by weight based on 100 parts by weight of the ceramic powder.

Figure 2:
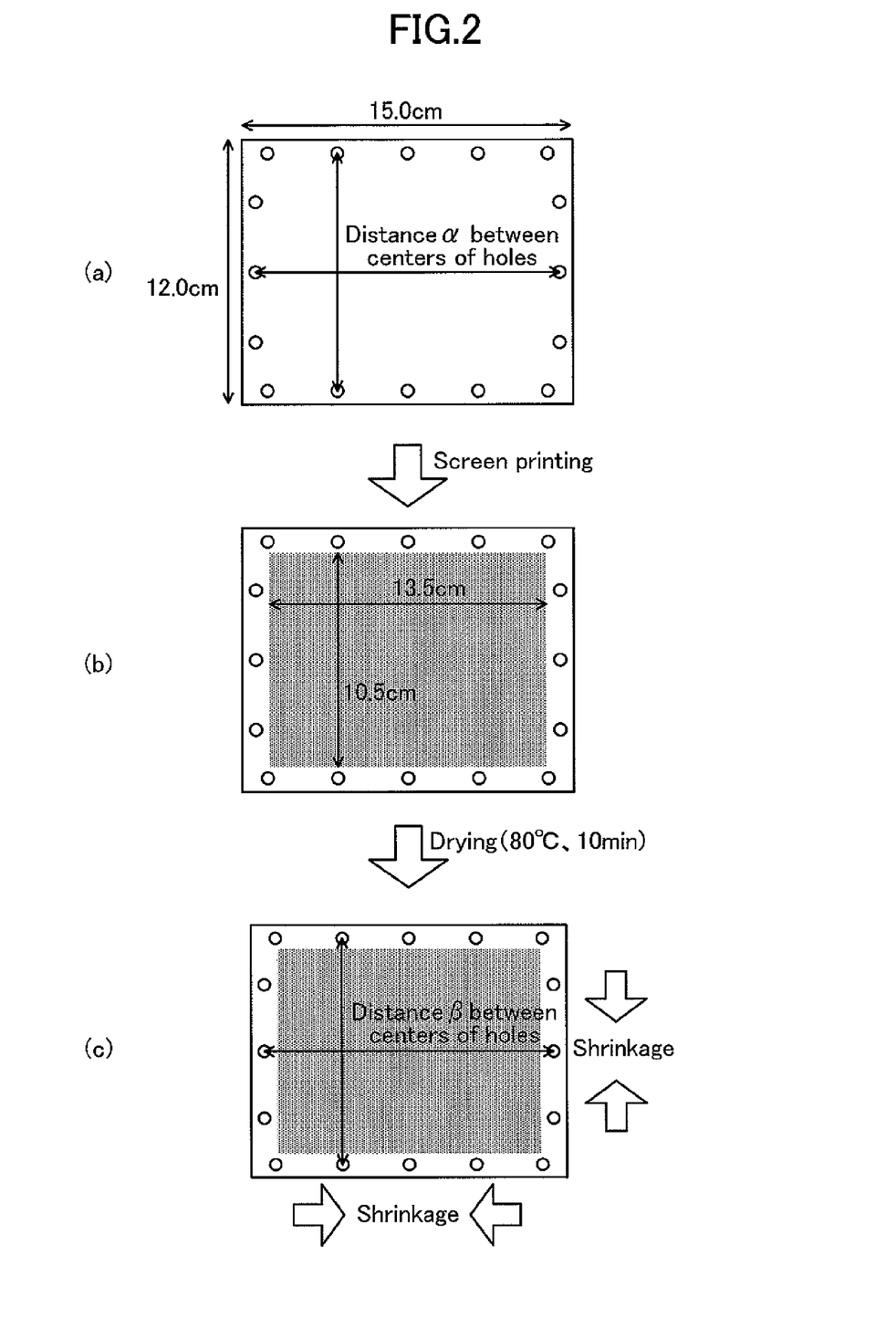
FIG. 2 is views for describing a method of measuring a dry shrinkage percentage of the ceramic green sheet.

In this experiment, the dry shrinkage percentage of the ceramic green sheet in each of the embodiments 1 to 3, and each of the conventional products A and B was measured. The measurement was carried out as illustrated in FIG. 2. Firstly, the completed (i.e., after the execution of the above-mentioned (step 4)) ceramic green sheet (having a rectangular planar shape) was prepared as illustrated in FIG. 2(a), wherein through-holes are formed on plural predetermined positions at the peripheral edge of the sheet. The distance α between the centers of the holes, which were opposite to each other in the longitudinal direction and in the lateral direction, was measured at the plural positions.

Then, as illustrated in FIG. 2(b), a thin sheet-like molded body of the paste having a predetermined pattern was printed (formed) on the central part, except for the peripheral edge, of the ceramic green sheet with a screen printing method (the above-mentioned (step 6)). The ratio of the "area where the molded body of the paste is printed" to the "area of the ceramic green sheet" is about 80% as viewed in a plane.

Next, the ceramic green sheet having the thin sheet-like molded body of the paste formed thereon was solidified and dried under the condition of "80° C., 10 minutes" (the above-mentioned (step 7)). Thus, the ceramic green body is formed.

Then, as illustrated in FIG. 2(c), the distances β between the centers of the holes, which were subject to the measurement of the center-to-center distances α, were respectively measured on the ceramic green sheet of the completed ceramic green body. The dry shrinkage percentage "(α−β)/α×100(%)" was calculated for the respective combinations of the center-to-center distances α and β. The average value of the dry shrinkage percentages calculated as described above is defined as the "dry shrinkage percentage of the ceramic green sheet". For the sake of convenience, the "dry shrinkage percentage of the ceramic green sheet" is referred to as the "dry shrinkage percentage" below.

As illustrated in Table 1, the "dry shrinkage percentage" of the ceramic green body illustrated in the upper columns is smaller. This point will be considered below.

<Comparison Between Conventional Product A and Conventional Product B>

The "dry shrinkage percentage" of the conventional product B is slightly smaller than the "dry shrinkage percentage" of the conventional product A. This is considered to be based upon the following reason. Specifically, it is considered that the reason why the "dry shrinkage percentage" is reduced is because a strong network is formed between the molecules of the urethane resin due to the crosslinking formed in the ceramic slurry caused through the urethane reaction as described above. The formation of the network makes it difficult to shorten the distance between the molecules of the urethane resin (organic binder), even if evaporation of residual solvent progresses.

However, it is considered that the reason why the "dry shrinkage percentage" is not significantly reduced is because polyvinyl butyral that is the resin containing a hydroxyl group (OH group) is used as the organic binder in the paste. Specifically, the hydroxyl group (OH group) reacts with (makes a urethane reaction with) the isocyanate group remaining in the ceramic green sheet to cause the action of shrinking the ceramic green sheet (the above-mentioned "reaction shrinkage by the urethane reaction").

Comparison Between Conventional Product B and Embodiments 1 to 3

The "dry shrinkage percentage" of each of the embodiments 1 to 3 is slightly smaller than the "dry shrinkage percentage" of the conventional product B. This is considered to be based upon the reason that the hydroxyl group (OH group) is not contained in the resin of the organic binder in the paste. Specifically, a subject that is reacted (makes the urethane reaction) with the isocyanate group (NCO group) remaining in the ceramic green sheet is not present in the paste, whereby the above-mentioned "reaction shrinkage by the urethane reaction" cannot be caused.

Comparison Among Embodiments 1 to 3

The "dry shrinkage percentage" of the embodiment 2 is smaller than the "dry shrinkage percentage" of the embodiment 3, and the "dry shrinkage percentage" of the embodiment 1 is smaller than the "dry shrinkage percentage" of the embodiment 2. This is considered to be based upon the reason described below. Firstly, the embodiments 1 and 3 will be considered with reference to FIGS. 3 and 4.

Figure 3:
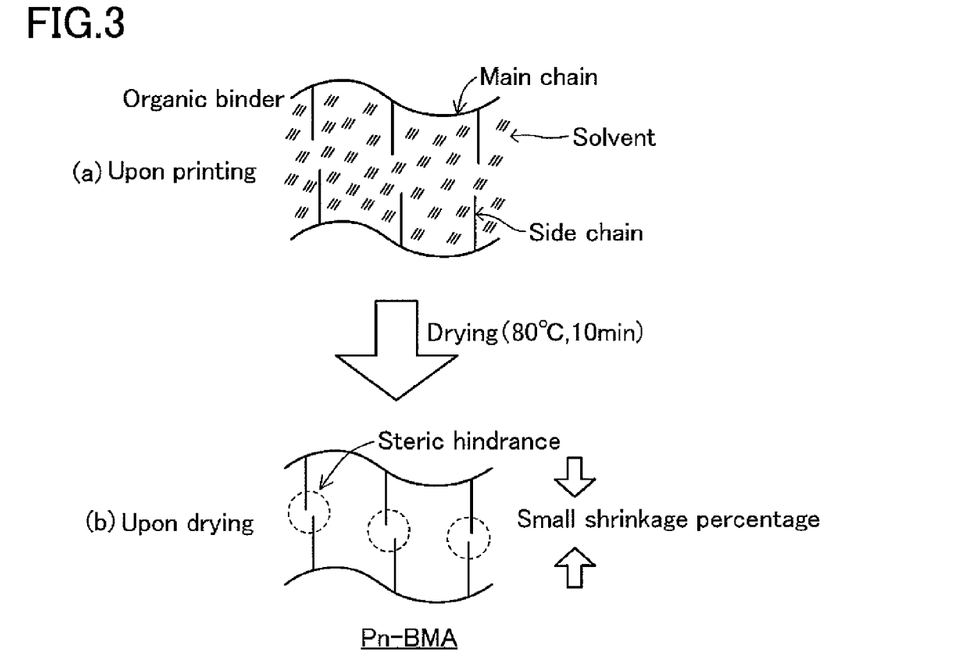
FIG. 3 is diagrams for describing that the dry shrinkage percentage is small when Pn-BMA is used as the organic binder in the paste, wherein (a) illustrates the status during the printing, and (b) illustrates the status during the drying.

As illustrated in FIG. 3, the side chain is relatively long in the Pn-BMA resin used as the "organic binder in the paste" in the embodiment 1. When the solvent is evaporated off the molded body (FIG. 3($a$)) of the paste printed on the ceramic green sheet by drying, the adjacent resins approach (FIG. 3($b$)). With this, the side chains extending from the respective resins interfere with one another (a so-called steric hindrance occurs). The inter-molecular distance of the adjacent resin molecules is determined due to the steric hindrance. Here, the side chain is relatively long in the Pn-BMA resin, so that the inter-molecular distance of the adjacent resin molecules after the occurrence of the steric hindrance becomes relatively large. Specifically, the ceramic green sheet is difficult to shrink.

Figure 4:
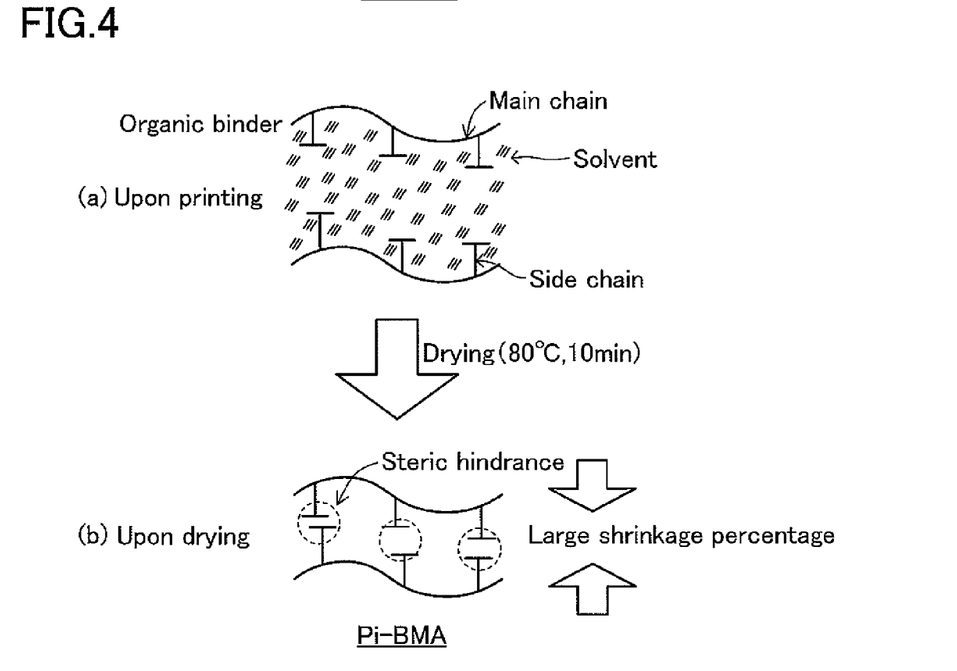
FIG. 4 is diagrams for describing that the dry shrinkage percentage is great when Pi-BMA is used as the organic binder in the paste, wherein (a) illustrates the status during the printing, and (b) illustrates the status during the drying

On the other hand, as illustrated in FIG. 4, the side chain is relatively short in the Pi-BMA resin used as the "organic binder in the paste" in the embodiment 3. Accordingly, the inter-molecular distance of the adjacent resin molecules after the occurrence of the steric hindrance is decreased, compared to the case in FIG. 3. Specifically, in the embodiment 3, the thin sheet-like molded body formed on the ceramic green sheet is easy to shrink, compared to the embodiment 1. As a result, the "dry shrinkage percentage" of the ceramic green sheet serving as a substrate on which the thin sheet-like molded body is formed is larger in the embodiment 3 than in the embodiment 1.

In the Pn/i-BMA resin used as the "organic binder in the paste" in the embodiment 2, the average value of the length of the side chain is smaller than that of the side chain in Pn-BMA resin and larger than that of the side chain in Pi-BMA resin. As a result, the "dry shrinkage percentage" in the embodiment 2 is larger than the "dry shrinkage percentage" in the embodiment 1 and smaller than the "dry shrinkage percentage" in the embodiment 3.

(Glass Transition Temperature of Organic Binder in Paste)

Next, a glass transition temperature of the organic binder in the paste will be considered. Tg illustrated in Table 1 represents the glass transition temperature of the organic binder in the paste, and it is a property value unique to the monomer of the organic binder. As illustrated in Table 1, it has been found that there is a tendency in which "the lower the grass transition temperature Tg is, the smaller the "dry shrinkage percentage" of the ceramic green sheet is". This is considered to be based upon the fact that, the lower the glass transition temperature Tg is, the longer the side chain of the organic binder in the paste is, and hence, the larger the inter-molecular distance of the adjacent resin molecules after the occurrence of the steric hindrance becomes.

In the ceramic green body described above, the thin sheet-like molded body (paste) formed on the ceramic green sheet can be used as an adhesive agent (adhesive paste) interposed between the adjacent sheets when plural ceramic green sheets are stacked. When the laminate of the ceramic green sheets is produced as described above, the applicant of the subject application sets the target value of the "dry shrinkage percentage" of each of the ceramic green sheets to be "0.075% or less".

Considering from the result in Table 1, it is preferable that the glass transition temperature of the organic binder in the paste is 40° C. or less in order to attain the target value that is "0.075% or less".

In addition, the temperature for thermal compression bond upon stacking the plural ceramic green sheets is generally set to be a temperature higher than the glass transition temperature by about 20° C. Therefore, when the glass transition temperature of the organic binder in the paste is 40° C. or less, the temperature for thermal compression bond can be set to fall within a sufficiently low range such as 60° C. or less. As a result, the dimensional precision during a thermal compression bonding process can easily be secured, compared to the case in which the temperature for thermal compression bond is high.

(Weight-Average Molecular Weight of Organic Binder in Paste)

Next, a weight-average molecular weight of the organic binder in the paste will be considered with reference to Table 2. Table 2 shows a result of an experiment that was conducted for confirming the relationship between the "weight-average molecular weight" and the "dry shrinkage percentage of the ceramic green sheet" in the Pn-BMA resin used as the "organic binder in the paste" in the embodiment 1, among the embodiments 1 to 3, in which the "dry shrinkage percentage" was the smallest.

TABLE 2

| Organic binder in paste | Weight-average molecular weight | Dry shrinkage percentage [%] |
| --- | --- | --- |
| Pn-BMA | 40,000 | 0.061 |
|  | 180,000 | 0.057 |
|  | 350,000 | 0.046 |

As illustrated in Table 2, it has been found that there is a tendency in which "the greater the weight-average molecular weight of the resin is, the smaller the "dry shrinkage percentage" of the ceramic green sheet is". This is considered to be based upon the reason described below. The greater the weight-average molecular weight is, the longer the main chain of the resin is (the length of the side chain is unchanged). When the solvent is evaporated off the thin sheet-like molded body of the paste printed on the ceramic green sheet through the drying as described above, the adjacent resins approach, so that the respective resins interfere with one another (a so-called steric hindrance occurs). It is considered that, after the occurrence of the steric hindrance, the longer the main chain is, the greater the inter-molecular distance of the adjacent resin molecules becomes. Specifically, it is considered that, the greater the weight-average molecular weight of the resin is, the smaller the "dry shrinkage percentage" of the ceramic green sheet becomes.

What is claimed is:

1. A ceramic green body, comprising:
    a thin ceramic green sheet containing a ceramic powder, and a urethane resin that is produced by mixing an isocyanate and a polyol and serves as an organic binder; and
    a thin sheet molded body that is formed on the ceramic green sheet, and contains a ceramic powder and an organic binder not containing a hydroxyl group, wherein the organic binder not containing a hydroxyl group is poly(n-butyl methacrylate) or a copolymer of poly(n-butyl methacrylate) and poly(i-butyl methacrylate).

2. A ceramic green body according to claim 1, wherein the ceramic green sheet is formed such that a ceramic slurry containing a ceramic powder, an unreacted portion of the isocyanate, an unreacted portion of the polyol, a urethane resin serving as the organic binder formed through reaction between the isocyanate and the polyol, and the solvent, which ceramic slurry is prepared by mixing the ceramic powder, isocyanate, polyol, and a solvent, is molded into a thin sheet shape, the urethane resin is further formed through reaction between the unreacted portion of the isocyanate and the unreacted portion of the polyol, the portions being contained in the molded body of the ceramic slurry, to thereby solidify the molded body, and the molded body of the ceramic slurry is dried to evaporate the solvent, and the thin sheet molded body is formed such that a thin sheet molded body of a paste, which is prepared by mixing a ceramic powder, an organic binder not containing the hydroxyl group, and the solvent, is formed on the ceramic green sheet, and the formed thin sheet molded body of the paste is dried to evaporate the solvent.

3. A ceramic green body according to claim 1, wherein the resin of the organic binder in the thin sheet molded body contains an ester group at a main chain and/or a side chain.

4. A ceramic green body according to claim 1, wherein the glass transition temperature of the organic binder in the thin sheet molded body is 40° C. or less.

5. A ceramic green body according to claim 1, wherein
    in the ceramic green sheet,
    a functional-group ratio of the polyol to the isocyanate that are employed for the mixing falls within a range of 1.5/11.5 to 11.5/11.5,
    the molecular weight of the urethane resin, which is defined as the sum of a value obtained by dividing the molecular weight of an isocyanate group by the isocyanate group content of the isocyanate employed for mixing and a value obtained by dividing the molecular weight of a hydroxyl group by the hydroxyl group content of the polyol employed for mixing, falls within a range of 290 to 988, and
    a ratio by weight of the urethane resin to the ceramic powder contained in the ceramic green sheet falls within a range of 4.5 to 10 parts by weight of the urethane resin based on 100 parts by weight of the ceramic powder.

6. A method for producing a ceramic green body comprising a thin ceramic green sheet containing a ceramic powder, and a urethane resin that is produced by mixing isocyanate and polyol and serves as an organic binder, and a thin sheet molded body that is formed on the ceramic green sheet, and contains a ceramic powder and an organic binder not containing a hydroxyl group, the method comprising:
    mixing together a ceramic powder, an isocyanate, a polyol, and a solvent, to thereby prepare a ceramic slurry containing the ceramic powder, an unreacted portion of the isocyanate, an unreacted portion of the polyol, a urethane resin serving as an organic binder formed through reaction between the isocyanate and the polyol, and the solvent;
    molding the ceramic slurry into a thin sheet;
    further forming the urethane resin through reaction between the unreacted portion of the isocyanate and the unreacted portion of the polyol, the portions being contained in the molded body of the ceramic slurry, to thereby solidify the molded body of the ceramic slurry, and dry the molded body of the ceramic slurry to evaporate the solvent, so as to form the ceramic green sheet;
    mixing the ceramic powder, an organic binder not containing a hydroxyl group, and the solvent to form a paste, wherein the organic binder not containing a hydroxyl group is poly(n-butyl methacrylate) or a copolymer of poly(n-butyl methacrylate) and poly(i-butyl methacrylate);
    forming the produced thin sheet molded body of the paste on the produced ceramic green sheet; and
    drying the formed thin sheet molded body of the paste to evaporate the solvent, to thereby form the thin sheet molded body on the ceramic green sheet.

7. A method for producing a ceramic green body according to claim 6, wherein the resin of the organic binder in the thin sheetmolded body contains an ester group at a main chain and/or a side chain.

8. A method for producing a ceramic green body according to claim 6, wherein the glass transition temperature of the organic binder in the thin sheet molded body is 40° C. or less.

9. A method for producing a ceramic green body according to claim 6, wherein
in the ceramic green sheet,
a functional-group ratio of the polyol to the isocyanate that are employed for the mixing falls within a range of 1.5/11.5 to 11.5/11.5,
the molecular weight of the urethane resin, which is defined as the sum of a value obtained by dividing the molecular weight of a isocyanate group by the isocyanate group content of the isocyanate employed for mixing and a value obtained by dividing the molecular weight of a hydroxyl group by the hydroxyl group content of the polyol employed for mixing, falls within a range of 290 to 988, and
a ratio by weight of the urethane resin to the ceramic powder contained in the ceramic green sheet falls within a range of 4.5 to 10 parts by weight of the urethane resin based on 100 parts by weight of the ceramic powder.

* * * * *